April 16, 1968  G. E. RUBERT  3,377,991

FISH TANK

Filed Aug. 22, 1966  2 Sheets-Sheet 1

INVENTOR.
GEORGE E. RUBERT
BY
William P. Hickey
ATTORNEY

April 16, 1968 G. E. RUBERT 3,377,991
FISH TANK

Filed Aug. 22, 1966 2 Sheets-Sheet 2

INVENTOR.
GEORGE E. RUBERT
BY
William P. Hickey
ATTORNEY

United States Patent Office 3,377,991
Patented Apr. 16, 1968

3,377,991
FISH TANK
George E. Rubert, 1938 Macomber St.,
Toledo, Ohio 43606
Filed Aug. 22, 1966, Ser. No. 574,113
7 Claims. (Cl. 119—5)

The present invention relates to tanks for the propagation and/or live storage of fish and the like.

One of the tests which is commonly made to determine the degree of pollution of water, is to place small fish called gambusia in the water to be tested to determine the effects on the fish. The gambusia must be propagated in the best condition possible until tests are made with the fish, and so it is important that the gambusia be grown and stored in small tanks, the water of which is well aerated, filtered, and treated, and kept at a generally constant temperature.

Fish tanks of the type of which we are concerned are also used for the storage of minnows that are used for fish bait. The minnows are usually raised in large ponds and are thereafter seined and placed in small tanks in preparation for shipment. After shipment, the minnows are again placed in small tanks in bait houses where the minnows are retailed to fishermen. In addition, the tanks are used for holding lobsters, oysters, and other marine life. The tanks can also be used to store fish eggs, such as salmon eggs and trout eggs. Space limitations require that as small a tank as possible be used for the purpose, and that the water be used over and over again in the most efficient manner.

An object of the present invention is the provision of a new and improved fish tank of the above described type having maximum efficiency, and which will sustain a maximum of fish life.

Another object of the invention is the provision of a new and improved fish tank which will be uniformly aerated to a maximum degree.

Another object of the invention is the provision of a new and improved fish tank of the above described type having large and easily removed filters for removing feces and other debris from the water as the water is used over and over again.

Another object of the invention is the provision of a fish tank of the above described type wherein the feces are caused to collect at the filter, and an arrangement is provided wherein the filter can be easily washed down with a water hose into a sump and the debris drained from the tank.

A further object of the invention is the provision of a fish tank of the above described type wherein a cascade of the recirculating water is allowed to free fall and carry entrained air to the bottom of the tank, following which the water uniformly moves to the opposite end of the tank where the feces are immediately filtered and removed, the water is treated with surface active agent, and the total flow of water is conducted back to the cascade type pump through one or more conduits totally contained within the tank.

A still further object of the invention is the provision of a fish tank of the immediately above described type wherein the side walls and bottom of the tank are smooth so that feces flow along with the water and are immediately separated.

Further objects and advantages of the invention will become apparent to those skilled in the art to which the invention relates from the following description of several preferred embodiments described with reference to the accompanying drawings forming a part of this specification, and in which.

The prior art has generally heretofore placed cascading types of recirculating aerators as close to the center of the tank as possible in order that the "dead spaces" in the tank would be confined to a minimum. The present invention has shown that this is not the most efficient arrangement. The fish tanks of the present invention are so efficient that a tank having a cross section of approximately 2 feet square by 7 feet long will support 50 pounds of fish life, whereas prior art tanks of the same size will only support 15 pounds of fish life.

Figure 1:
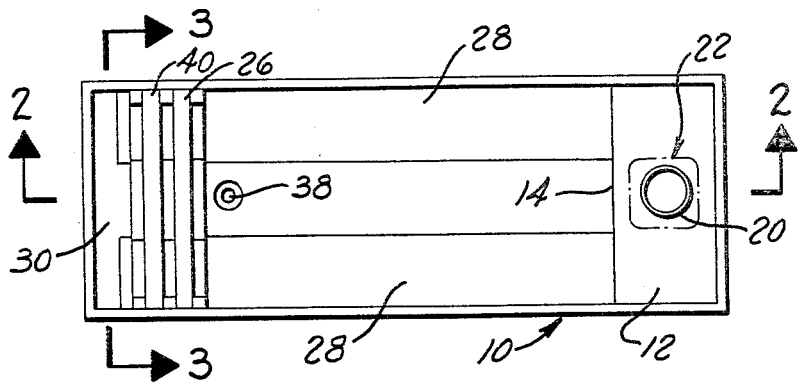
FIG. 1 is a plan view of a fish tank embodying principles of the present invention.
Figure 2:
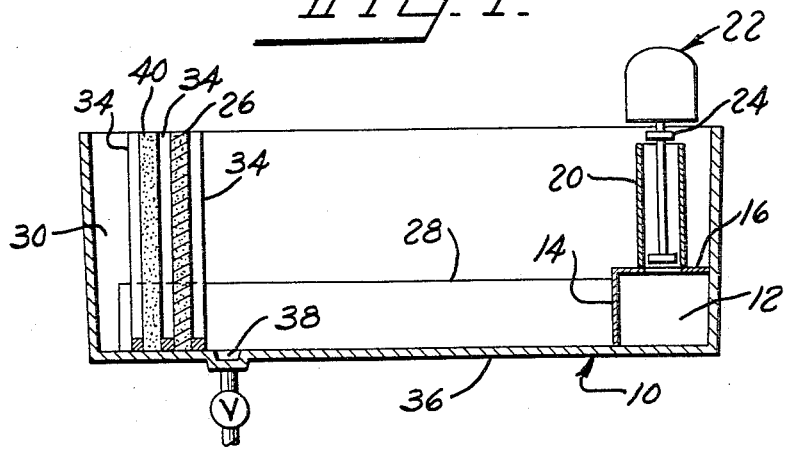
FIG. 2 is a longitudinal cross sectional view taken approximately on the line 2—2 of FIG. 1.
Figure 3:
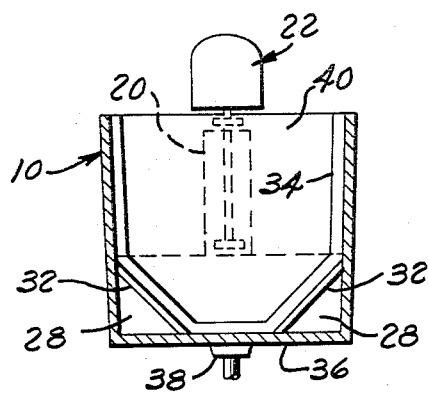
FIG. 3 is a vertical sectional view taken approximately on the line 3—3 of FIG. 1.

The embodiment of fish tank 10 shown in FIGS. 1–3 is made of glass fiber reinforced polyester resin, and has a generally square vertical cross section and an open top. Best performance is had when the tanks are oblong and have a length at least approximately 2½ times the width of the tank. A convenient size of tank is approximately 2 feet wide and 2 feet deep and has a length of approximately 7 feet. The length of the tank may be made 14 feet or more, and can operate efficiently with length over width ratios of as high as approximately 10:1. Glass fiber reinforced polyester tanks are particularly suited for supporting fish life, since they do not corrode, will last substantially indefinitely, and have smooth surfaces. These tanks are built in an inverted position on molds, and so the side walls of the tank preferably taper outwardly by approximately 1 inch per foot so that they can be removed from the mold. In addition to the above advantages, reinforced plastic has the further advantage that the conduits and partitions about to be described can be conveniently and economically installed by cementing in place after the tank is molded.

The tank shown in FIGS. 1–3 includes a plenum chamber 12 positioned at one end of the tank. The plenum chamber 12 is formed by a vertical partition 14 which joins with a cover plate 16 that is located at approximately 10 inches above the bottom of the tank. The cover plate 16 has a circular opening 18 therethrough, and which is located approximately at the center of the cover plate for receiving the lower end of a draft tube 20. The draft tube 20 is part of a cascading type recirculating pump 22, which takes suction from the plenum chamber, aerates the water, and allows it to free fall back into the tank. The water issues out of the top of the draft tube 20 where it is hit by an impeller 24 to greatly subdivide the water, and the rim of small droplets forms air bubbles at the surface of the water, which air bubbles are driven to the bottom of the tank due to the momentum of the water.

According to the invention, the water with the entrained air bubbles is caused to move longitudinally of the tank at a generally uniform velocity. Uniform movement of the water longitudinally of the tank is produced in part by a partition 26 of filter material located adjacent the opposite end of the tank. Suction for the plenum chamber 12 is had from the opposite end of the tank by means of conduits 28 which connect the suction chamber 30, formed by the filter 26 and the opposite end of the tank, to the plenum chamber 12. In the embodiment shown, each of the conduits 28 shown are formed by a sheet 32 of plastic material that is cemented between the bottom of the tank and a respective side wall of the tank. The filter partition 26 is lowered vertically into position between spaced guides 34 which are cemented in place and extend down the side walls, across the plate 32, the bottom 36 of the tank, across the other sheet 32 and up the other side wall of the tank. The filter partition 26, therefore, extends across the full cross section of the tank in which the fish are located. Such a construction has the advantage of equalizing flow. Any area of the tank having a greater flow than other areas of the tank tend to accumulate material on the filter 26 faster than the other areas to reduce the flow through this area. There are, therefore, no permanent stagnant portions along the side walls of the tank.

The inclined plates 32 help to form a trough at the bottom of the tank which causes the feces of the fish to be carried along in a stream by the flow of the water. This stream, of course, is stopped by the filter 26, and the tank preferably includes a sump drain 38 located just forwardly of the filter, which can be opened periodically to remove this material. In addition, a water hose can be directed at the front face of the filter to wash the accumulation of material downwardly toward the sump to extend the use of the filter between cleanings.

In order to sustain maximum fish life, it is necessary to remove urea, mucous and other materials from the water. This is conveniently accomplished by a surface active material such as charcoal that is located in the suction chamber 30 between the filter 26 and the opposite end of the tank. In some instances, the surface active agent may be located in a bed at the bottom of the tank, but in the preferred embodiment is supported in a partition 40 similar to the filter partition 26. Such a partition 40 has the advantage that all of the water passing through the filter 26, must pass through the partition 40 and be treated. It has the further advantage that the partition 40 can easily be removed by lifting it vertically in the same manner as the partition 26. The partition 40 is similarly supported in place by guides 34.

In the operation of the tank above described, water that is cooled by the unit 22 by refrigeration coils, not shown, located within the draft tube 20 is subdivided by the impeller 24 and is thrown to the surface of the water to drive tiny air bubbles downwardly. Since the total suction for the cascading recirculating pump 22 is taken from the suction chamber 30 at the opposite end of the tank, the cascaded water is caused to move from the cascading unit 22 towards the opposite end of the tank. Because the filter 26 extends across the full cross section of the tank, any uneven distribution or channeling that occurs in the cross section of the tank is compensated for by a build up of deposits on the filter 26 to reduce the flow through the channel. A substantially uniform flow throughout the total cross section therefore, is achieved. The fish swim with their heads facing the cascade unit. The velocity of water should preferably not be greater than approximately ¼ foot per second, because it has been found that at approximately 4 feet per second, the fish become tired and are drowned. Because the tank will so thoroughly aerate the water, and is so efficient, it is possible to support 50 pounds of fish life in the same size tank that will support 15 pounds of fish life when the cascade unit 22 is located centrally thereof. At such a high density of fish life, the fish must distribute themselves uniformly throughout the cross section. It is very important, therefore, that no channels exist wherein a velocity of more than approximately 1 foot per second exists. This is automatically controlled by the blocking of the filter 26 with foreign materials. Because the total flow through the tank is thoroughly aerated and thoroughly cleansed of urea and other poisons during each cycle, it is only necessary to control the rate of water recirculation. This can be easily sensed by the velocity of the air bubbles down the tank. When the rate of water flow becomes too low, filter 26 is either hosed down into the sump 28 or is removed vertically and a new filter 26 slid in place. All guess work as to conditions in the tank are removed, and control is reduced to a visual observation of the rate of water flow.

Figure 4:
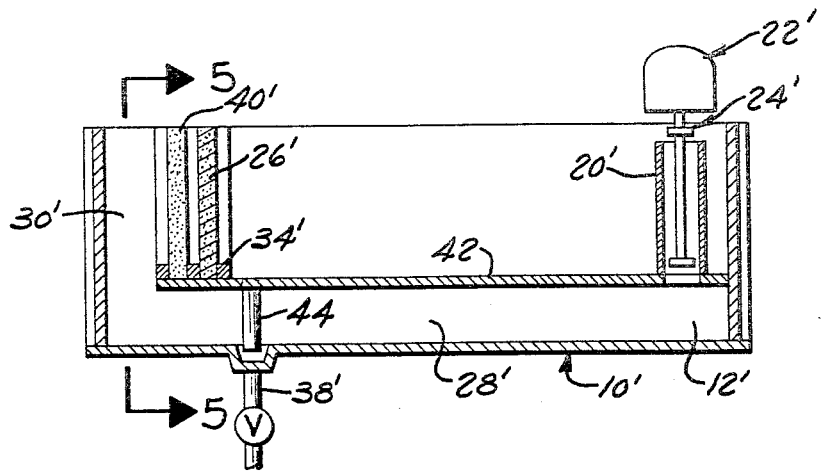
FIG. 4 is a longitudinal vertical sectional view through another embodiment of the invention.
Figure 5:
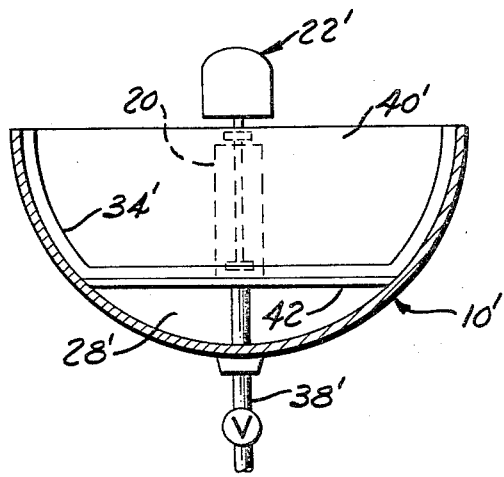
FIG. 5 is a vertical cross sectional view taken approximately on the line 5—5 of FIG. 4.

The embodiment shown in FIGS. 4 and 5 is generally similar to that shown in FIGS. 1–3 and differs principally therefrom in that it is made in the form of a hemi-cylinder. Those portions of the embodiment shown in FIGS. 4 and 5 which correspond to similar portions in FIGS. 1–3 are designated by a like reference numeral characterized further in that a prime mark is affixed thereto. The shell of the tank 10' can conveniently be made for example from a half section of pipe or the like. In the embodiments shown in FIGS. 4 and 5, the plenum chamber 12' and return conduit 28' are formed integrally by a horizontal plate that is laid across the bottom of the hemi-cylinder approximately 8 inches from its lowest most point. A sump 38' may in some instances be located below the end of the plate 42 in the suction chamber 30', but is preferably located beneath the forward face of the filter 26'. A small tube 44 is installed in an opening in the plate 42, and by making the tube 44 of appropriate size with its lower end extend into the sump 38', fish are not able to escape from the upper chamber of the tank to the return passage 28'.

It will now be seen that the fish tank construction above described provides optimum conditions, simplifies control and maintenance, and will maintain a far greater amount of fish life than prior art tanks.

While the invention has been described in considerable detail, I do not wish to be limited to the particular embodiments shown and described, and it is my intention to cover hereby all novel adaptations, modifications, and arrangements thereof which come within the practice of those skilled in the art to which the invention relates.

I claim:

1. A fish tank having a length to width ratio greater than approximately 2½ to 1, said tank having a generally square cross section and having integral sides and bottom made from glass fiber reinforced plastic, a plenum chamber adjacent one end of said tank for receiving the draft tube of a lift pump for cascading water back into the tank, a partition filter extending vertically across said tank adjacent the opposite end from said plenum chamber, a pair of conduits for returning water from the space between the opposite end of said tank and filter to said plenum chamber, said conduits having a triangular cross section and each being formed by sheet material cemented in place between the bottom and respective sidewalls of said tank, and a drain located in said bottom between said conduits on the plenum side of said filter.

2. The fish tank of claim 1 having a partition container for surface active agent extending across said tank between said filter and the opposite end of said tank and through which all water passes.

3. A fish tank having a length to width ratio greater than approximately 2½ to 1, a plenum chamber adjacent one end of said tank for receiving the draft tube of a pump for cascading water back into the tank, a partition filter extending vertically across said tank adjacent the opposite end from said plenum chamber forming a space, and a conduit in said tank connecting said chamber and said space for communicating water from the space between said opposite end of said tank and filter to said plenum chamber and said pump.

4. The fish tank of claim 3 having a partition container for surface active agent extending vertically across said tank between said filter and the opposite end of said tank, said filter and surface active agent container being arranged to be withdrawn vertically from said tank.

5. The tank of claim 3 wherein said plenum chamber and said conduit are formed by a generally flat plate spaced vertically from the bottom of said tank, and wherein a sediment drain is provided in said plate on the plenum chamber side of said partition filter.

6. A tank for marine life having upstream and downstream ends and a length to width ratio between said ends of greater than approximately 2½ to 1, a generally horizontal flat plate spaced vertically from the bottom most portion of said tank to form upper and lower tank chambers, said plate having a suction opening therethrough adjacent said upstream end of said tank constructed and arranged to receive the inlet of a lift pump for circulating water from said lower tank chamber to said upper tank chamber, said plate also being arranged to provide a return port between said chambers at said downstream end of the tank, a first foraminous member extending vertically from said plate across said upper tank chamber, said first member forming a filter and being spaced to the upstream side of said return port, a second foraminous member containing a surface active agent positioned on the downstream side of said first foraminous member, said foraminous members being arranged to sequentially filter and absorb contaminates from water flowing from said upstream to said downstream ends of said tank, and said lower chamber acting as a return conduit of the cleaned and filtered water to said suction opening, said plate having a sump positioned on the upstream side of said first foraminous member for collecting sediment from said upper chamber, and means for draining said sump.

7. The tank of claim 6 wherein said second foraminous member is a partition extending vertically from said plate on the downstream side of said first foraminous filter member.

References Cited

UNITED STATES PATENTS

| 475,082 | 5/1892 | Gunther | 119—5 |
| 2,594,474 | 4/1952 | McGrath | 119—5 |
| 2,672,845 | 3/1954 | Schneithorst | 119—5 |
| 2,696,800 | 12/1954 | Rork | 119—5 |
| 2,981,228 | 4/1961 | Brandano | 119—2 |
| 3,057,094 | 10/1962 | Winkelman | 119—5 |
| 3,122,126 | 2/1964 | Yamada | 119—3 |
| 3,146,195 | 8/1964 | Berardi | 210—169 |
| 3,149,608 | 9/1964 | Murphy | 119—5 |
| 3,255,731 | 6/1966 | Girard | 119—3 |
| 3,324,829 | 6/1967 | DeJosé et al. | 119—5 |

ALDRICH F. MEDBERY, *Primary Examiner.*

UNITED STATES PATENT OFFICE
CERTIFICATE OF CORRECTION

Patent No. 3,377,991　　　　　　　　　　　　　　April 16, 1968

George E. Rubert

It is certified that error appears in the above identified patent and that said Letters Patent are hereby corrected as shown below:

Column 2, line 55, "rim" should read -- rain --.

Signed and sealed this 12th day of August 1969.

(SEAL)
Attest:

Edward M. Fletcher, Jr.　　　　　　　　　WILLIAM E. SCHUYLER, JR.
Attesting Officer　　　　　　　　　　　　　　Commissioner of Patents